United States Patent
DeLuca et al.

(10) Patent No.: US 10,135,941 B2
(45) Date of Patent: Nov. 20, 2018

(54) MANAGING PUSH NOTIFICATIONS ON PORTABLE DEVICES

(71) Applicant: International Business Machines Corporation, Armonk, NY (US)

(72) Inventors: Lisa Seacat DeLuca, Baltimore, MD (US); Dana L. Price, Surf City, NC (US); Aaron J. Quirk, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 15/047,058

(22) Filed: Feb. 18, 2016

(65) Prior Publication Data

US 2017/0244798 A1 Aug. 24, 2017

(51) Int. Cl.
*H04L 29/08* (2006.01)
*H04W 4/20* (2018.01)
*H04W 4/14* (2009.01)
*H04L 29/06* (2006.01)

(52) U.S. Cl.
CPC .............. *H04L 67/26* (2013.01); *H04L 69/28* (2013.01); *H04W 4/14* (2013.01); *H04W 4/20* (2013.01)

(58) Field of Classification Search
CPC ................................. H04L 67/26; H04W 4/12
See application file for complete search history.

(56) References Cited

U.S. PATENT DOCUMENTS

| 6,111,295 A | 8/2000 | Arai |
| 8,468,265 B2 | 6/2013 | Mohler |
| 2002/0107958 A1* | 8/2002 | Faraldo, II ............. H04L 41/00 709/224 |
| 2005/0021540 A1* | 1/2005 | McKee .................. G06Q 10/10 |
| 2008/0148148 A1 | 6/2008 | Ramanathan et al. |
| 2008/0184267 A1 | 7/2008 | Hochmuth |
| 2011/0167383 A1* | 7/2011 | Schuller .................. G06F 9/451 715/808 |
| 2011/0244955 A1* | 10/2011 | Dinka ................ H04N 5/44591 463/31 |

(Continued)

FOREIGN PATENT DOCUMENTS

CA  2855067 A1  12/2014

OTHER PUBLICATIONS

Aguilar, M., "Automatic Do-Not-Disturb Measures Your Brainwaves to Know When You're Busy", Gizmodo, Apr. 4, 2013, 12:30 PM, Filed to Wish You Were Here, 3 pages, <http://gizmodo.com/5993631/automatic-do-not-disturb-measures-your-brainwaves-to-know-when-youre-busy>.

Heeris, J., "This is Why You Shouldn't Interrupt a Programmer", The Slightly Disgruntled Scientist, Wednesday, Oct. 16, 2013, 5 pages, <http://heeris.id.au/2013/this-is-why-you-shouldnt-interrupt-a-programmer>.

(Continued)

*Primary Examiner* — Omoniyi Obayanju
(74) *Attorney, Agent, or Firm* — William H. Hartwell

(57) ABSTRACT

A method for managing push notifications on portable devices. The method includes receiving an indication from a user of a mobile device to initiate a notification rule at a first time. The method further includes identifying a context for initiation of the notification rule, wherein the context includes at least one application of the mobile device that is executing on the mobile device at the first time. The method further includes determining whether the context is present at a second time. The method further includes, responsive to determining the context is present at the second time, initiating the notification rule.

14 Claims, 7 Drawing Sheets

(56) References Cited

U.S. PATENT DOCUMENTS

| | | |
|---|---|---|
| 2012/0198372 A1 | 8/2012 | Kuhlke |
| 2013/0332721 A1 | 12/2013 | Chaudhri et al. |
| 2014/0179377 A1* | 6/2014 | Song .................... H04L 67/306 |
| | | 455/566 |
| 2014/0253319 A1 | 9/2014 | Chang |

OTHER PUBLICATIONS

Horvitz, E. et al., "Attention-Sensitive Alerting*", Proceedings of UAI '99, Conference on Uncertainty and Artificial Intelligence, Stockholm, Sweden, Jul. 1999, Morgan Kaufmann: San Francisco, pp. 305-313.

Spira, J. et al., "The Cost of Not Paying Attention: How Interruptions Impact Knowledge Worker Productivity", Sep. 2005. Copyright 2004 Basex., Inc., 21 pages.

Zeldes, N., "BrainYno: the Ultimate Solution to Information Overload?", Nathan Zeldes, Posted on Jun. 5, 2013, Posted in Individual Solutions, Copyright 2015 nathanzeldes.com, 7 pages, <http//www.nathanzeldes.com/blog/2013/06/brainyno-the-ultimate-solution-to-information-overload>.

"Emails 'hurt IQ more than pot'", CNN.com, Apr. 22, 2005, Posted 8:08 AM EDT, 2 pages, <http://www.cnn.com/2005/WORLD/europe/04/22/text.iq>.

"Silence your device with "Do not disturb"", Nexus Help, © Google, Found in Main Idea for Disclosure END820150254-Archived on Oct. 22, 2015 01:07:53 AM [Accessed Online- Printed on Feb. 18, 2016 9:01 AM], 7 pages,<https://support.google.com/nexus/answer/6111295>.

* cited by examiner

MANAGING PUSH NOTIFICATIONS ON PORTABLE DEVICES

BACKGROUND

The present invention relates generally to the field of notification messages, and more particularly to the management of push notifications on portable devices.

Push notifications, also referred to as server push notifications, are the delivery of information from a software application to a computing device without a specific request from the computing device. Push notifications allow applications to notify end users of new messages, or events, even when end users are not actively using the application. Push notifications typically, but not always, originate from a server. In many cases, end users must opt-in to receive push notifications. Opt-ins usually takes place during the application install process, but end users are typically also provided with a way to manage alerts independently of the install process in case they change their preferences at a later time.

SUMMARY

Embodiments of the present invention disclose a method, computer program product, and system for managing push notifications on portable devices. The method includes receiving an indication from a user of a mobile device to initiate a notification rule at a first time. The method further includes identifying a context for initiation of the notification rule, wherein the context includes at least one application of the mobile device that is executing on the mobile device at the first time. The method further includes determining whether the context is present at a second time. Responsive to determining the context is present at the second time, initiating the notification rule.

DETAILED DESCRIPTION

Embodiments in accordance with the present invention recognize that when using any device, such as a mobile phone, tablet, or a desktop computer, that receives push notifications, there are situations where a user will want to suppress notifications for a period of time. Users of portable devices may wish to suppress push notifications at times when the device or applications cannot anticipate the context within which this capability is desired. Embodiments of the present invention disclose a method for a user of a portable device to customize his or her experience so that notifications and interruptions will not occur in specific situations across different applications and contexts.

Some embodiments of the present invention disclose a system that allows a user to create default notification properties for applications (e.g., voice call notification, text message or instant message arrivals, email arrivals, reminders, calendar notifications, etc.) and permits the user to define contexts within which those default notifications will be temporarily suspended. A context can be any information relating to a state of a device. A context may include, for example: (i) one or more applications that are executing (or "open") on the device, (ii) information regarding the state of one or more applications that are executing (or "open") on the device (e.g., the application is minimized), (iii) a time of day, and/or (iv) one or more user actions being performed on the device (e.g., the user touching the user interface, the user taking a turn in a game, the user waiting for another user to take a turn, the user typing an email, etc.). This may apply across all kinds of form factors (desktops, tablets, and smartphones) and related applications. Some embodiments of the present invention introduce a unique process for a user to identify and flag a desired application-specific context which the operating system (OS) can then leverage to change notification behavior in the future.

Figure 1:
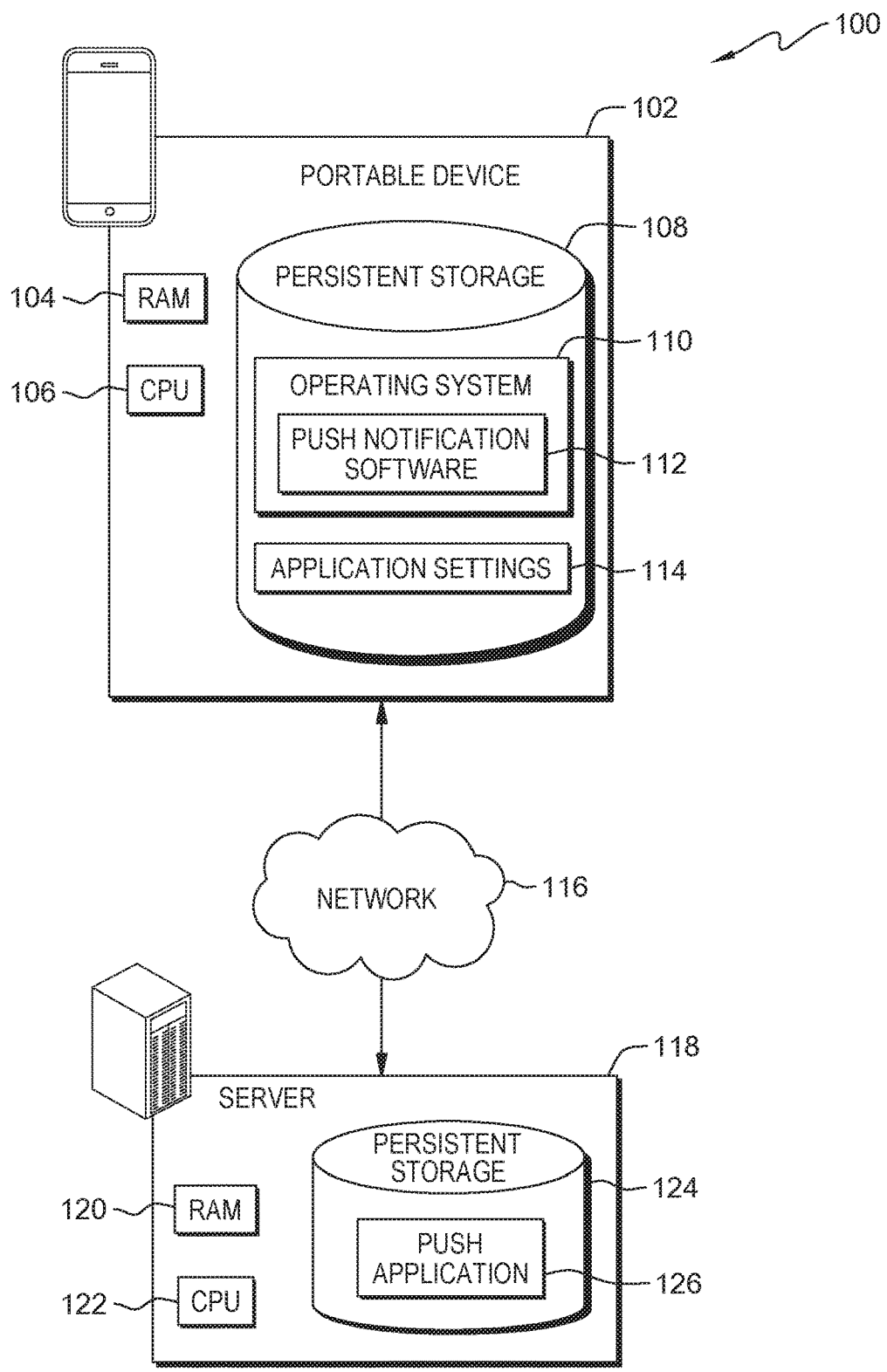
FIG. 1 is a functional block diagram illustrating a push notification environment, in an embodiment in accordance with the present invention.

Embodiments in accordance with the present invention will now be described in detail with reference to the Figures. FIG. 1 is a functional block diagram, generally designated 100, illustrating a push notification environment, in an embodiment in accordance with the present invention.

Push notification environment 100 includes portable device 102, server 118, and other computing devices (not shown), all interconnected over network 116. Portable device 102 includes random access memory (RAM) 104, central processing unit (CPU) 106, and persistent storage 108. Portable device 102 may be any other electronic device or computing system, capable of processing program instructions and receiving and sending data. In some embodiments, portable device 102 may be a laptop computer, a tablet computer, a netbook computer, a personal computer (PC), a desktop computer, a personal digital assistant (PDA), a smart phone, a smart watch or any programmable electronic device capable of communicating over a data connection to network 116. In other embodiments, portable device 102 may represent server computing systems utilizing multiple computers as a server system, such as in a distributed computing environment. In general, portable device 102 is representative of any electronic devices or combinations of electronic devices capable of executing machine-readable program instructions and communicating with server 118 via network 116 and with various components and devices (not shown) within push notification environment 100.

Portable device 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Operating system 110 is stored in persistent storage 108, and contains push notification software 112. Persistent storage 108 also contains application settings 114.

Operating system 110 is software that enables portable device 102 to communicate with server 118 and other computing devices (not shown) of push notification environment 100 over a data connection on network 116. Persistent storage 108 includes application settings 114 that are used by push notification software 112 to store user settings pertaining to applications and contexts for push notifications. Application settings 114 are configurable by a user via a user interface of portable device 102, or through the application settings of one or more executing programs, or set of applications, on portable device 102. In other example embodiments, push notification software 112 and application settings 114 may be components of an operating system software.

Push notification software 112 is a computer program, or sets of computer programs, that are stored in persistent storage 108. Push notification software 112 enables a user to register applications and contexts to create notification rules for suppressing push notifications. For example, a user may be engaged in an application on portable device 102 and receive a push notification or other notification. The arriving notification (for example, a text message) will pause the application and require interaction by the user to clear the screen and/or deal with the arriving message, or the notification may be represented by a sound or vibration on the portable device 102. The user is disrupted by the sound, vibration, or message and may be required to take another action to resume the application. However, the user may have forgotten where he or she was previously in the application, resulting in less-than-optimum performance. Embodiments of the present invention enable a user of portable device 102 to define one or more contexts in which application default notifications may be temporarily suspended via one or more notification rules, wherein the contexts and the notification rules are configurable by the user. In other example embodiments, push notification software 112 may allow a user to create an exception list to allow certain contacts to send push notifications or text messages while the user is using a certain application or in a particular context.

Figure 7:
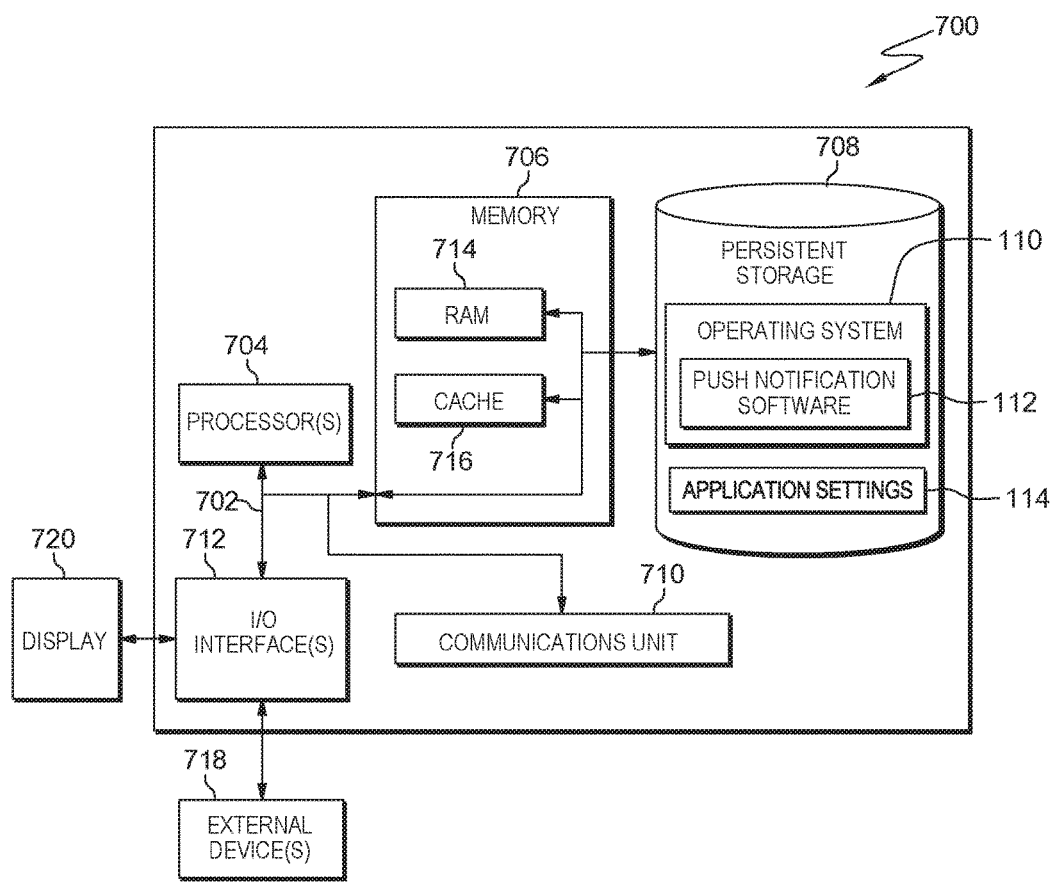
FIG. 7 depicts a block diagram of components of the portable device executing the push notification software, in an embodiment in accordance with the present invention.

Portable device 102 may include internal and external hardware components, as depicted and described in further detail with respect to FIG. 7.

In FIG. 1, network 116 is shown as the interconnecting fabric between portable device 102, server 118, and with various components and devices (not shown) within push notification environment 100. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between portable device 102, server 118, and with various components and devices (not shown) within push notification environment 100.

Server 118 is included in push notification environment 100. Server 118 includes user random access memory (RAM) 120, central processing unit (CPU) 122, and persistent storage 124. Server 118 may be a Web server, or any other electronic device or computing system, capable of processing program instructions and receiving and sending data. In some embodiments, server 118 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, server 118 may represent server computing systems utilizing multiple computers as a server system, such as in a distributed computing environment. In general, server 118 is representative of any electronic devices or combinations of electronic devices capable of executing machine-readable program instructions and communicating with portable device 102 via network 116 and with various components and devices (not shown) within push notification environment 100.

Server 118 includes persistent storage 124. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer-readable storage medium that is capable of storing program instructions or digital information. Push application 126 is stored in persistent storage 124, which also includes operating system software, as well as software that enables server 118 to detect and establish a connection to portable device 102, and communicate with other computing devices (not shown) of push notification environment 100 over a data connection on network 116. In the example embodiment of FIG. 1, push application 126 may be used to send push notifications or messages to portable device 102 or other devices (not shown) within push notification environment 100.

Figure 2:
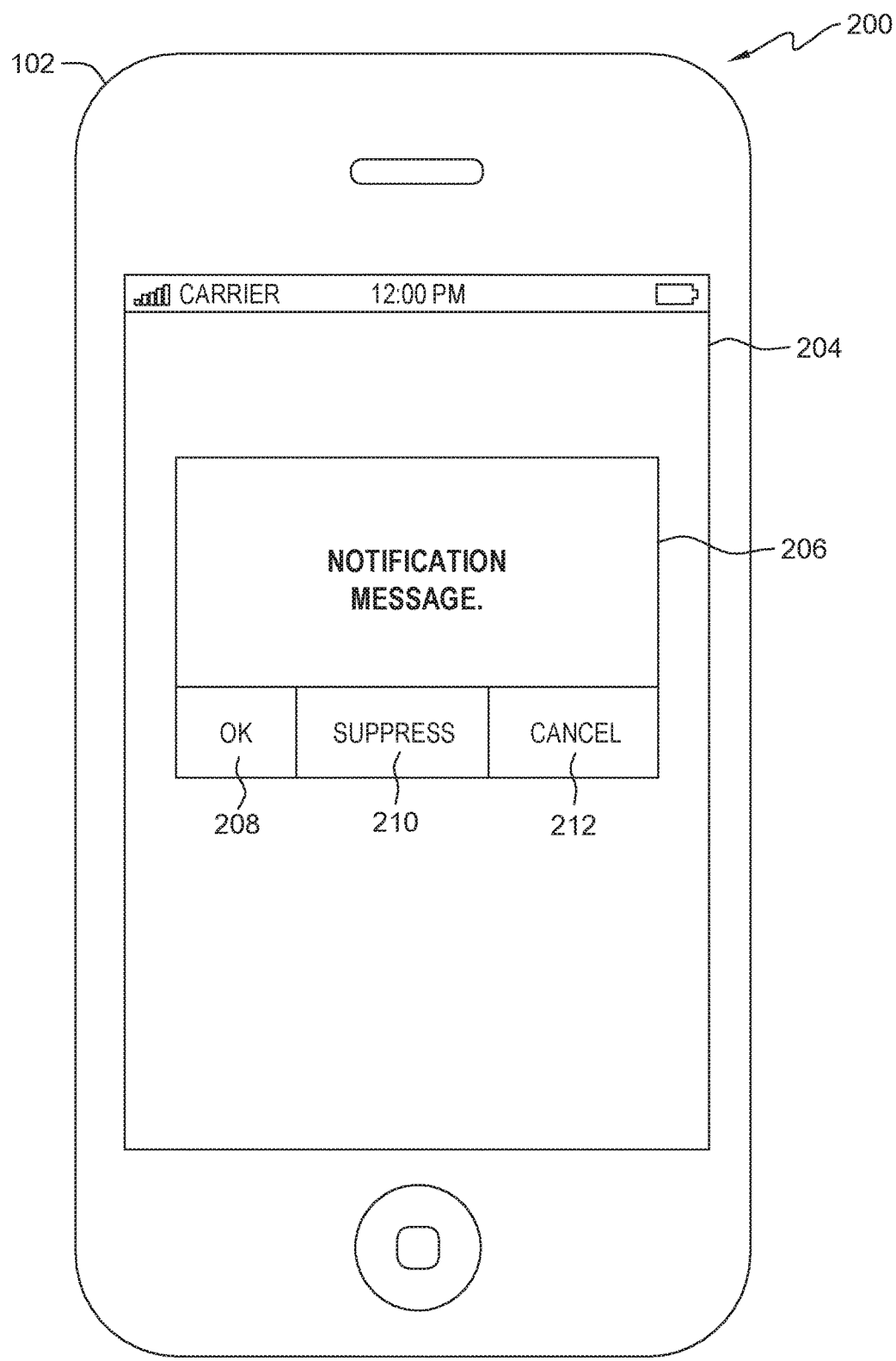
FIG. 2 is an illustration of a push notification, received on a portable device within the push notification environment of FIG. 1, for enabling a user to suppress push notifications within the context of an executing application, in an embodiment in accordance with the present invention.

FIG. 2 is an illustration, generally designated 200, of a push notification, received on a portable device (e.g. portable device 102) within the push notification environment of FIG. 1, for enabling a user to suppress push notifications within the context of an executing application, in an embodiment in accordance with the present invention. In an example embodiment, a user receives a visual notification (e.g., notification message 206), on user interface 204 while using an application on portable device 102. Notification message 206 contains the received message and provides the user with 3 options, "OK" 208, "Suppress" 210, and "Cancel" 212. Examples of notifications include, but are not limited to, the following: (i) push notifications, (ii) text messages, (iii) email notifications, (iv) Short Message Service (SMS) messages, and (v) phone calls. SMS is a text messaging service component of a mobile device, such as portable device 102, Web, or mobile communication systems that uses standardized communications protocols to allow fixed line or mobile phone devices to exchange short text messages.

The user of portable device 102 determines that the context for the application should be special, or uninterrupted, and suspends notifications during a particular time or while the application is in use. Push notification software 112 displays received notification message 206 on user interface 204 as depicted in FIG. 2. Notification message 206 presents the user with the option to "Accept" received notification message 206 using option "OK" 208, suppress received notification message 206 using option "Suppress" 210, or ignore received notification message 206 using option "Cancel" 212. Upon the user accepting received notification message 206 by selecting option "OK" 208, the target application indicated by received notification message 206 is launched, or brought forward into view, to allow the user of portable device 102 to perform one or more actions regarding received notification message 206.

Upon suppressing received notification message 206 in response to the user selecting option "Suppress" 210, push notification software 112 registers the current executing application and/or the context in application settings 114 to suppress, or prevent, future notifications from being displayed on user interface 204 when the user is using the same application and/or is in the same context. Push notification software 112 searches for previously defined push notification rules to determine if a rule matches the current executing application and/or context. If a matching rule is found, push notification software 112 stores the push notification until a later time when the push notification rule is deactivated, or when the user of portable device 102 decides to view the suppressed push notification. If an existing push notification rule is not found, push notification software 112 creates a new push notification rule for the current executing application and/or the context, and stores the received push notification in persistent storage 108. In one example embodiment, suppressing future notifications may include, but is not limited to, suppressing audio notifications (e.g., sounds), visual notifications (e.g., text or image), and haptic notifications (e.g., vibrations and temperature). In other example embodiments, upon selecting option "Suppress" 210, push notification software 112 may present the user with an option to register exception types for notifications that would not be suppressed while the user is engaged in the current application and/or context. In another example embodiment, responsive to exiting the current application, push notification software 112 may present the user with an option to view one or more suppressed notification messages 206.

Upon canceling received notification message 206 by selecting option "Cancel" 212, push notification software 112 discards received notification message 206 and allows the user to continue interacting with the current application and/or context.

In other example embodiments, responsive to exiting the current application, push notification software 112 may present the user with an option to view one or more received notification messages 206. For example, after exiting the current application, push notification software 112 may provide the user with a list of one or more suppressed notification messages 206 via user interface 204. The user may then select a suppressed notification message from the one or more suppressed notification messages to view and take actions for.

Figure 3:
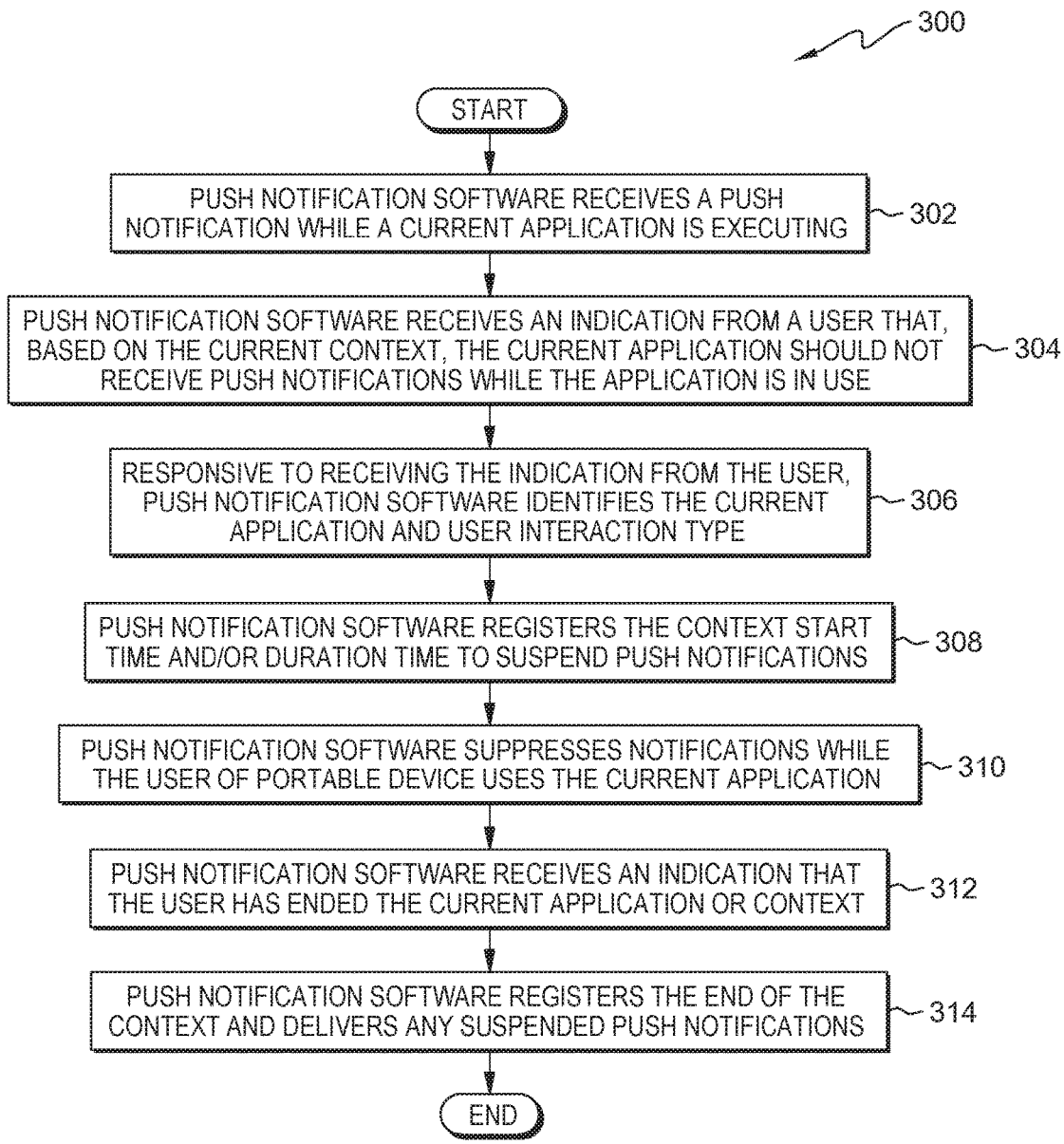
FIG. 3 is a flowchart depicting operational steps of push notification software, on a portable device within the push notification environment of FIG. 1, for suppressing push notifications within the context of an executing application, in an embodiment in accordance with the present invention.

FIG. 3 is a flowchart, generally designated 300, depicting operational steps of push notification software, on a portable device within the push notification environment of FIG. 1, for suppressing push notifications within the context of an executing application, in an embodiment in accordance with the present invention. In an example embodiment, push notification software 112 receives a push notification from server 118 over a data connection to network 116 while an application is executing as depicted in step 302. For example, while interacting with a current application, a user of portable device 102 receives a push notification on user interface 204, such as notification message 206, from push application 126 on server 118.

In step 304, push notification software 112 receives an indication from a user of portable device 102 that, based on the current context, the current application should not receive push notifications while the application is in use. For example, the current application may require the full attention of the user of portable device 102 so any received notifications, such as notification message 206, would be disruptive. In this case, the user of portable device 102 may have selected option "Suppress" 210 (as discussed with reference to FIG. 2) to prevent any further push notifications while the current application is executing, and to prevent future push notifications from interrupting the user of portable device 102 when executing the same application at a later time. In another example, a user may suppress, or suspend, push notifications while the user is typing an email in an email application (or performing any other specific interaction with an application). The suspended push notifications may then be displayed after the context ends, for example when the user presses "send" or when the email is stored. In other example embodiments, a user may define or create a push notification rule to suspend or suppress push notification during a certain time period. For example, the user of portable device 102 may not want to be disturbed while exercising and may create a push notification rule to suspend push notifications from 7:00 AM to 8:00 AM on a calendar entry that repeats daily. Upon determining the daily calendar entry in the calendar application, push notification software 112 may activate the daily rule at 7:00 AM, then deactivate the daily rule at 8:00 AM and display any stored push notifications.

Responsive to receiving the indication from the user, push notification software 112 identifies the current application and the user interaction type as depicted in step 306. Push notification software 112 receives an instruction (e.g. from the current application) indicating the current application and the context which the application is currently in and stores the instruction in application settings 114. For example, upon a user selecting "suppress" 210 on notification message 206, push notification software 112 may receive the name of the current application, a path, or location of the executable code for the current application, an application state, or a level of user interaction, and a historical use indication (i.e., previous application settings), of the current application.

In step 308, push notification software 112 registers the context start time and/or duration time to create a notification rule to suspend push notifications. For example, push notification software 112 may register the time that the current application began executing on portable device 102 as the start time, and an end time relating to the termination of the current application, or when the current application is closed. Push notification software 112 creates the one or more notification rules using the registered context start time and/or duration time to suspend push notifications. Although the current notification rule is to suspend push notifications, notification rules can include a wide variety of available notification-related actions performable by portable device 102. For example, notification rules can include, but are not limited to: (i) rules to display notifications in a different way, (ii) rules to show certain notifications (e.g., via an exception list) while suspending others, (iii) rules to prioritize certain notifications over others, (iv) rules to change the type of notification (e.g., from a visual notification to an audio notification, or vice versa), and/or (v) rules to enable previously suspended notifications. One example of a notification rule may be to suppress all push notifications on portable device 102 for all applications and/or contexts. Another example of a notification rule may be to suspend push notifications for specific applications, however any notifications listed in an exception list may be displayed as a small icon in a corner of user interface 204. In one example embodiment, a notification rule may delay the push notification, or display the push notification less prominently (e.g., displayed on a portion of user interface 204, where the push notification does not disrupt, or block, the current application). In other example embodiments, push notification software 112 may register one or more time periods to suppress push notifications based on the historical use indication of the current application. For example, a particular context may begin with an indicator, such as a button press or icon selection, and lasts for a finite time (or until another indicator such as a different button press or icon presence). In another example embodiment, push notification software 112 may register the duration time for suppressing push notification messages to coincide with the start time and end time of the execution for the current application.

Push notification software 112 suppresses notifications while the user of portable device 102 uses the current application as depicted in step 310. Upon registering the application and suppression period, the application user of portable device 102 continues interacting with the current application. Any received push notification messages, sent by push application 126 on server 118 or other devices (not shown) of push notification environment 100, are suppressed and stored by push notification software until the current application is ended, or the user indicates to stop suppressing push notifications.

In step 312, push notification software 112 receives an indication that the user has ended the application or the context is no longer present. For example, the user of portable device 102, using user interface 204, indicates to push notification software 112 to start allowing push notifications again. In another example embodiment, push notification software 112 may detect the current application has ended or has been minimized, or paused.

Push notification software 112 registers the end of the context and delivers any suspended push notifications, as depicted in step 314. Push notification software 112 then removes, or deactivates, any push notification suppression settings for the current application. Push notification software 112 terminates, or deactivates, the notification rule for the current application and/or context. Upon detecting the current application has ended or has been minimized, push notification software 102 may display the suppressed push notifications on user interface 204 as depicted in FIG. 2.

In another example embodiment, push notification software 112 may receive an indication from a user of a mobile device to initiate a notification rule at a first time. For example, a user of portable device 102 may define a notification rule via push notification software 112 prior to executing any applications. Push notification software 112 may then identify a context for initiation of the notification rule, wherein the context includes at least one application of the mobile device that is executing on the mobile device at the first time (i.e., a first instance of a context matching the notification rule). Later, after the notification rule has been deactivated, push notification software 112 may then determine whether the context is present at a second time and initiate the notification rule again.

Figure 4:
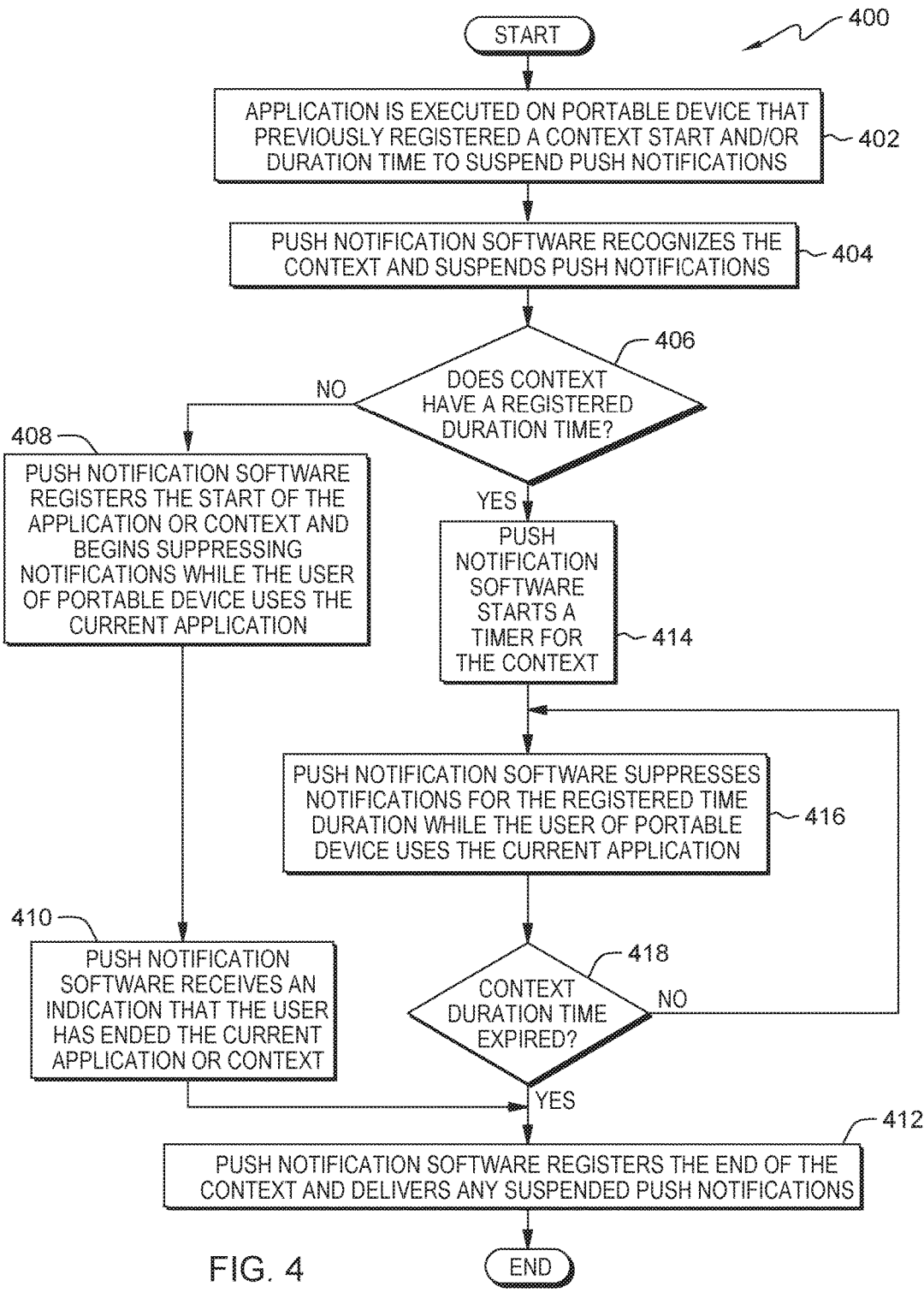
FIG. 4 is a flowchart depicting operational steps of push notification software suppressing push notifications, on a portable device within the push notification environment of FIG. 1, by recognizing the start of a context for a previously registered application, in an embodiment in accordance with the present invention.

FIG. 4 is a flowchart, generally designated 400, depicting operational steps of push notification software suppressing push notifications, on a portable device within the push notification environment of FIG. 1, by recognizing the start of a context for a previously registered application, in an embodiment in accordance with the present invention. In an example embodiment, push notification software 112 identifies that an application has been executed on portable device 102 where push notification software 112 previously registered a context start and/or duration time to suspend push notifications, as depicted in step 402. For example, a context may include a user of portable device 102 launching or executing a favorite application using user interface 204. In other example embodiments, the application may be launched or executed as a scheduled task.

In step 404, push notification software 112 recognizes the context and suspends push notifications. For example, in response to the application being launched or executed, or a context being entered, push notification software 112 determines if the application was previously registered by searching for the application name and/or context in application settings 114. In other example embodiments, applications may automatically register start and end execution contexts with push notification software 112.

In decision step 406, push notification software 112 determines if the application and/or context has a registered duration time in application settings 114. If the application and/or context does not have a registered duration time ("No" branch, decision step 406), push notification software 112 registers the start of the application or context and begins suppressing push notification messages while the user uses the current application as depicted in step 408. In other example embodiments, upon determining that the application and/or context does not have a registered duration time or end of the context, push notification software 112 may determine if the user of the application would like to end the suppression of push notifications via user interface 204. In step 410, push notification software 112 receives an indication that the user has ended the application or context. Stated another way, the user exits or minimizes the application or indicates the end of the context through the application settings. The user may also indicate the end of the context using push notification software 112 and application settings 114 via user interface 204. Push notification software 112 registers the end of the context and delivers any suspended push notifications to the user via user interface 204 as depicted in step 412.

If the application and/or context has a registered duration time ("Yes" branch, decision step 406), push notification software 112 starts a timer for the started application and/or context as depicted in step 414. For example, push notification software 112 reads the registered information for the application in application settings 114 and initializes, or instantiates, a timer using the stored context time duration of the application. In other example embodiments, push notification software 112 may ask the user of portable device 102 to verify the time duration before starting the timer to allow adjustments to the registered duration time. In step 416, push notification software 112 suppresses push notification messages for the registered time duration while the user continues to use the application.

In decision step 418, push notification software 112 determines if the timer for the context duration time has expired. If push notification software 112 determines that the timer for the context duration time has expired ("Yes"

branch, decision 418), push notification software 112 registers the end of the context and delivers any suspended push notifications to the user via user interface 204 as depicted in step 412. If push notification software 112 determines that the timer for the context duration time has not expired ("No" branch, decision 418), push notification software 112 continues to suppress push notifications while the user is engaged with the application as depicted in step 416.

Figure 5:
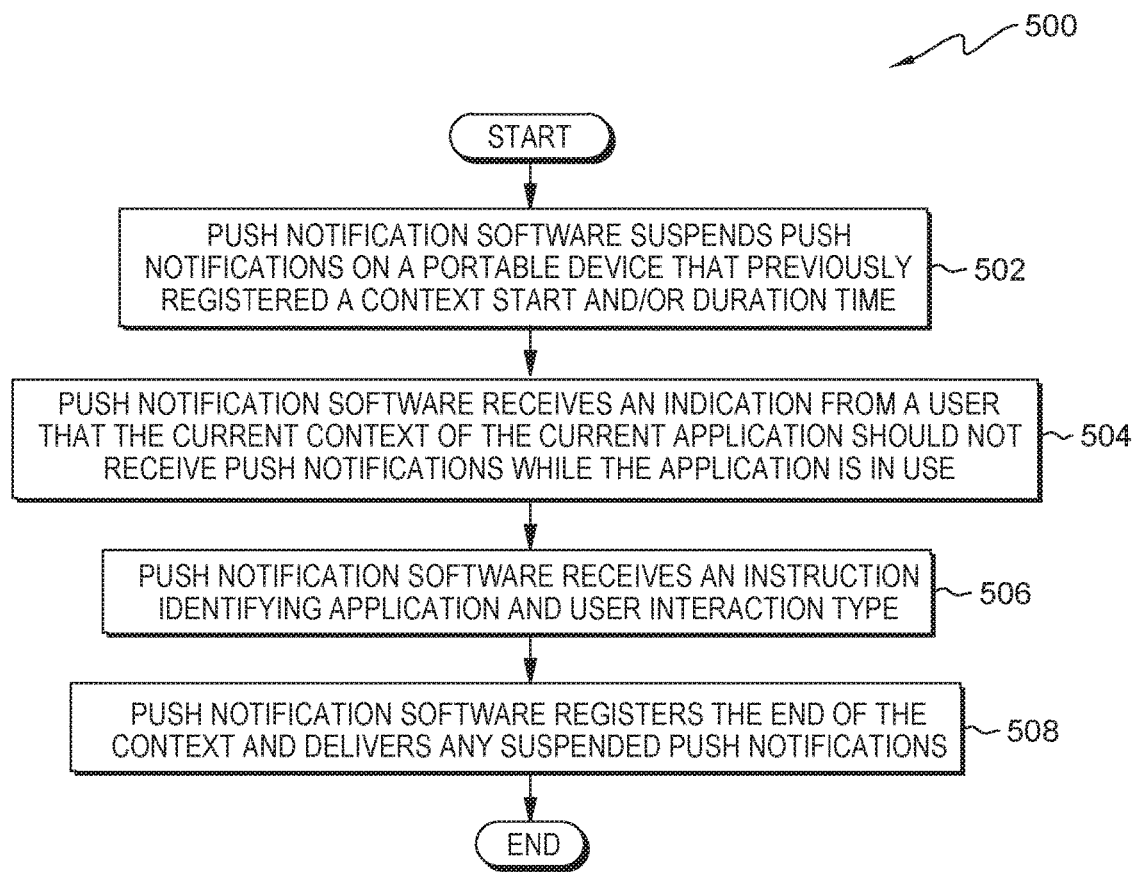
FIG. 5 is a flowchart depicting operational steps of push notification software deactivating the suppression of push notifications, on a portable device within the push notification environment of FIG. 1, by receiving an indication from a user, in an embodiment in accordance with the present invention.

FIG. 5 is a flowchart, generally designated 500, depicting operational steps of push notification software deactivating the suppression of push notifications, on a portable device within the push notification environment of FIG. 1, by receiving an indication from a user, in an embodiment in accordance with the present invention. In an example embodiment, push notification software 112 suspends push notifications on portable device 102 for an application that previously registered a context start and/or duration time as depicted in step 502. In other example embodiments, the user of portable device 102 may be using more than one application simultaneously and be switching between the first and second application. As the user of portable device 102 is switching between the first and second application, push notification software 112 may suspend push notification messages during the execution of both the first and second applications as the context is switched using user interface 204. For example, when the context is switched to the first application, push notification software 112 suspends notifications using the rule defined for the first application. When the user switches the context to the second application, push notification software 112 suspends notifications using the rule defined for the second application.

In step 504, push notification software 112 receives an indication from a user of portable device 102 that the current context of the current application should receive push notifications while the application is in use. For example, the user may open application settings 114 and re-enable push notification messages for the current application.

Push notification software 112 receives an instruction identifying application and user interaction type as depicted in step 506. For example, push notification software 112 may receive information relating to the application, such as the application name, and the new duration time of zero. In other example embodiments, push notification software 112 may receive a binary data value indicating to re-enable push notification messages for the current application. Upon receiving the binary data value, push notification software updates the previous notification rule for the current application and/or context to indicate the notification rule is now inactive to re-enable push notification messages for the current application.

In step 508, push notification software 112 registers the end of the context and delivers any suspended push notifications. For example, push notification software 112 registers the new value or indication for suppressing push notification messages and delivers any previously received push notifications that may have been received during the suppression period.

Figure 6:
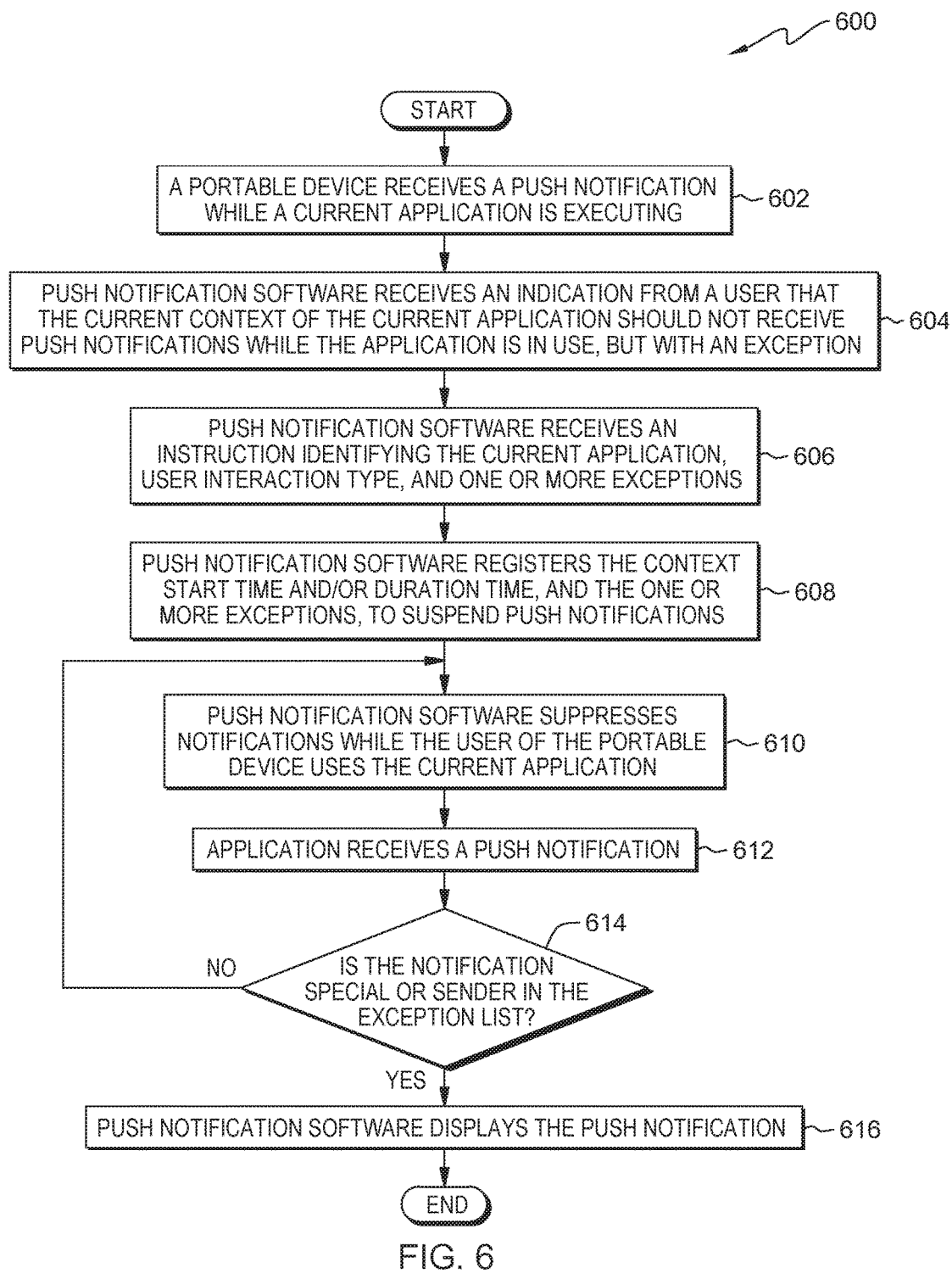
FIG. 6 is a flowchart depicting operational steps of push notification software, on a portable device within the push notification environment of FIG. 1, for registering push notification suppression exceptions within the context of an executing application, in an embodiment in accordance with the present invention.

FIG. 6 is a flowchart, generally designated 600, depicting operational steps of push notification software, on a portable device within the push notification environment of FIG. 1, for registering push notification suppression exceptions within the context of an executing application, in an embodiment in accordance with the present invention. In an example embodiment, push notification software 112 receives a push notification from server 118 over a data connection to network 116 while an application is executing as depicted in step 602. For example, while interacting with a current application, a user of portable device 102 receives a push notification on user interface 204, such as notification message 206, from push application 126 on server 118.

In step 604, push notification software 112 receives an indication from a user of portable device 102 that the current context of the current application should not receive push notifications while the application is in use, but with an exception, also referred to as a special exception. A special exception may be any notification or set of notifications that the user defines as not to be suspended under the notification rule. For example, the user may want all push notifications suppressed except messages from a family member. Some examples of other special exceptions include, but are not limited to, the following: (i) an indicated severity of the received notification, (ii) types of notifications (e.g., text v. phone call), (iii) the application(s) that generated the notification, and (iv) the text content within the notification.

Push notification software 112 receives an instruction identifying the current application, user interaction type, and one or more exceptions as depicted in step 606. For example, the user of portable device 102 may select option "Suppress" 210 to prevent any further push notifications while the current application is executing, and to prevent future push notifications from interrupting the user of portable device 102 when executing the same application at a later time. Push notification software 112 may then display a second dialogue enabling the user to select one or more contacts to allow notifications from while the application is in use. Push notification software 112 receives an instruction indicating the current application, the context in which the application is currently in, and the one or more exceptions and stores the instructions in application settings 114.

In step 608, push notification software 112 registers the context start time and/or duration time, and the one or more exceptions, to suspend push notifications while the application is in use. For example, push notification software 112 may register the current time of portable device 102, an end time relating to the termination, or when the current application is closed, and the exception list comprised of the one or more contacts. In other example embodiments, push notification software 112 may register one or more time periods to suppress push notifications and one or more exceptions based on the historical use indication of the current application. In another example embodiment, the user may configure push notification exceptions once, and the push notification exceptions may apply to all contexts where notification suppression occurs.

The application user of portable device 102 continues to use the current application as depicted in step 610. Upon registering the application, suppression period, and the one or more exceptions, the application user of portable device 102 continues interacting with the current application. Any received push notification messages, sent by push application 126 on server 118 or other devices (not shown) of push notification environment 100 that are not in the exception list are suppressed and stored by push notification software 112 until the current application is ended, or the application user indicates to stop suppressing push notifications.

In step 612, push notification software 112 receives a push notification from push application 126 on server 118 or another device (not shown) of push notification environment 100. In decision step 614, push notification software 112 determines if the notification is special or if the sender is in the exception list. If the notification is not special or the sender is not in the exception list ("No" branch, decision step 614), push notification software 112 repeats steps 610 through 612 as depicted in FIG. 6. If the received push notification is special or the sender is in the exception list ("Yes" branch, decision step 614), push notification software 112 displays the received push notification message on user interface 204 as depicted in step 616.

FIG. 7 depicts a block diagram, generally designated 700, of components of the portable device 102 executing the push notification software, in an embodiment in accordance with the present invention. It should be appreciated that FIG. 7 provides only an illustration of one implementation and does not imply any limitations with regard to the environments in which different embodiments may be implemented. Many modifications to the depicted environment may be made.

Portable device 102 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Operating system 110, containing push notification software 112, and application settings 114 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices, including resources of network 116 and server 118. In these examples, communications unit 710 includes one or more network interface cards. Communications unit 710 may provide communications through the use of either or both physical and wireless communications links. Operating system 110, containing push notification software 112, and application settings 114 may be downloaded to persistent storage 708 through communications unit 710.

I/O interface(s) 712 allows for input and output of data with other devices that may be connected to portable device 102. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., operating system 110, containing push notification software 112, and application settings 114, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Automatically" means "without any human intervention."

What is claimed is:

1. A computer-implemented method comprising:
receiving, by one or more computer processors, an indication from a user of a mobile device to activate a notification rule for a first application of the mobile device, wherein the indication from the user includes the user selecting an option to suppress a first received notification while the user is using the first application;

activating, by one or more computer processors, the notification rule for the first application based on the received indication;

receiving, by one or more computer processors, a second notification from a server for display on the mobile device;

responsive to receiving the second notification, and responsive to determining the notification rule for the first application is active, determining, by one or more computer processors, whether the first application is executing on the mobile device;

responsive to determining the first application is executing on the mobile device, temporarily suspending, by one or more computer processors, the second notification by preventing the second notification from being displayed on the mobile device while the first application is executing;

responsive to determining that the user has switched a context of the mobile device from the first application to a second application that is executing on the mobile device, activating, by one or more computer processors, a notification rule for the second application; and responsive to determining the notification rule for the second application is active, and responsive to determining the second application is executing on the mobile device, continuing to temporarily suspend, by one or more computer processors, the second notification by preventing the second notification from being displayed on the mobile device while the second application is executing.

2. The computer-implemented method of claim 1, wherein the notification rule for the first application further includes: a set of time periods for which one or more notifications are to be suspended.

3. The computer-implemented method of claim 1, wherein the notification rule for the first application further includes: a set of notifications that are not to be suspended under the notification rule.

4. The computer-implemented method of claim 1, further comprising:
determining, by one or more computer processors, the second application is no longer executing on the mobile device; and
responsive to determining the second application is no longer executing on the mobile device, displaying, by one or more computer processors, the temporarily suspended second notification on the mobile device.

5. The computer-implemented method of claim 1, wherein the notification rule for the first application and the notification rule for the second application are configurable by the user.

6. A computer program product comprising:
one or more computer readable storage media and program instructions stored on the one or more computer readable storage media, the program instructions comprising:
program instructions to receive an indication from a user of a mobile device to activate a notification rule, wherein the notification rule identifies an application of the mobile device for a first application of the mobile device, wherein the indication from the user includes the user selecting an option to suppress a first received notification while the user is using the first application;
program instructions to activate the notification rule for the first application based on the received indication;
program instructions to receive a second notification from a server for display on the mobile device;
program instructions to, responsive to receiving the second notification, and responsive to determining the notification rule for the first application is active, determine whether the first application is executing on the mobile device;
program instructions to, responsive to determining the first application is executing on the mobile device, temporarily suspending the second notification by preventing the second notification from being displayed on the mobile device while the first application is executing;
program instructions to, responsive to determining that the user has switched a context of the mobile device from the first application to a second application that is executing on the mobile device, activate a notification rule for the second application; and
program instructions to, responsive to determining the notification rule for the second application is active, and responsive to determining the second application is executing on the mobile device, continue to temporarily suspend the second notification by preventing the second notification from being displayed on the mobile device while the second application is executing.

7. The computer program product of claim 6, wherein the notification rule for the first application further includes: a set of time periods for which one or more notifications are to be suspended.

8. The computer program product of claim 6, wherein the notification rule for the first application further includes: a set of notifications that are not to be suspended under the notification rule.

9. The computer program product of claim 6, further comprising:
program instructions to determine the second application is no longer executing on the mobile device; and
program instructions to, responsive to determining the second application is no longer executing on the mobile device, displaying the temporarily suspended second notification on the mobile device.

10. The computer program product of claim 6, wherein the notification rule for the first application and the notification rule for the second application are configurable by the user.

11. A computer system comprising:
one or more computer processors;
one or more computer readable storage media;
program instructions stored on the one or more computer readable storage media for execution by at least one of the one or more computer processors, the program instructions comprising:
program instructions to receive an indication from a user of a mobile device to activate a notification rule for a first application of the mobile device, wherein the indication from the user includes the user selecting an option to suppress a first received notification while the user is using the first application;
program instructions to activate the notification rule for the first application based on the received indication;
program instructions to receive a second notification from a server for display on the mobile device;
program instructions to, responsive to receiving the second notification, and responsive to determining the notification rule for the first application is active, determine whether the first application is executing on the mobile device;
program instructions to, responsive to determining the first application is executing on the mobile device, temporarily suspending the second notification by preventing the second notification from being displayed on the mobile device while the first application is executing;

program instructions to, responsive to determining that the user has switched a context of the mobile device from the first application to a second application that is executing on the mobile device, activate a notification rule for the second application; and program instructions to, responsive to determining the notification rule for the second application is active, and responsive to determining the second application is executing on the mobile device, continue to temporarily suspend the second notification by preventing the second notification from being displayed on the mobile device while the second application is executing.

12. The computer system of claim 11, wherein the notification rule for the first application further includes a set of time periods for which one or more notifications are to be suspended.

13. The computer system of claim 11, wherein the notification rule for the first application further includes: a set of notifications that are not to be suspended under the notification rule.

14. The computer system of claim 11, further comprising:
program instructions to determine the second application is no longer executing on the mobile device; and
program instructions to, responsive to determining the second application is no longer executing on the mobile device, displaying the temporarily suspended second notification on the mobile device.

* * * * *